United States Patent Office 2,993,077
Patented July 18, 1961

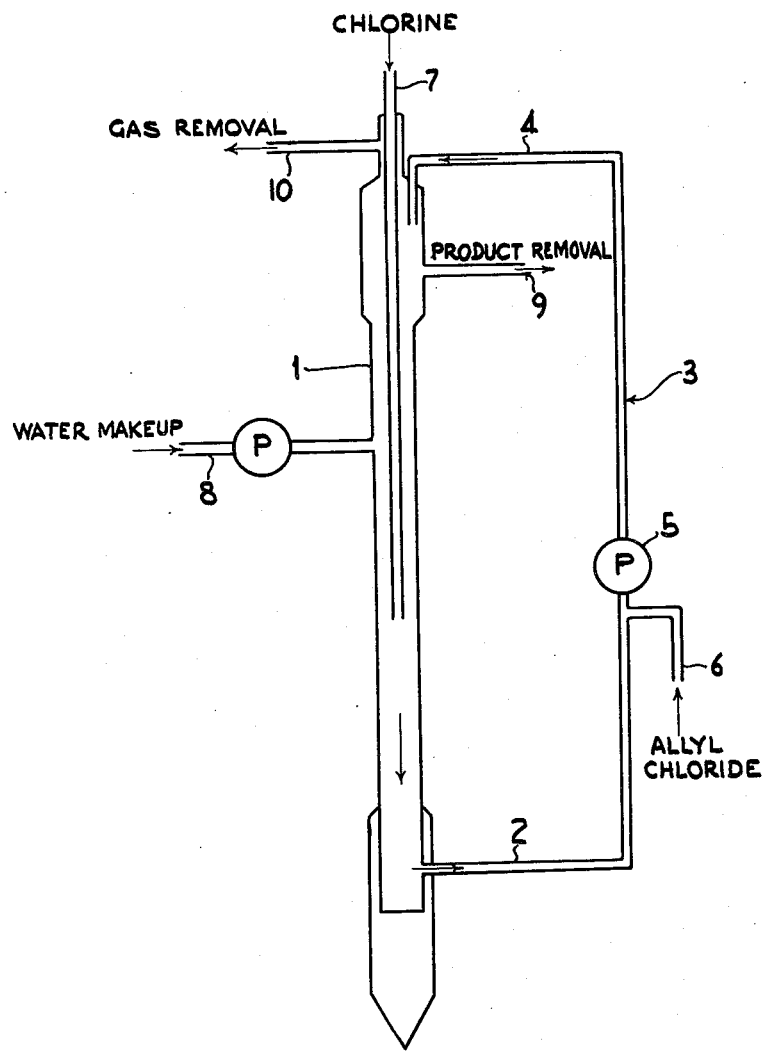

2,993,077
DICHLOROHYDRIN PRODUCTION
Fred C. Trager, Akron, Ohio, assignor, by mesne assignments, to Pittsburgh Plate Glass Company
Filed Jan. 9, 1959, Ser. No. 785,810
4 Claims. (Cl. 260—633)

This invention deals with the manufacture of glycerol dichlorohydrins by the hypochlorination of allyl chloride.

Glycerol dichlorohydrins (hereinafter sometimes referred to as dichlorohydrin for purposes of brevity) are prepared, according to one general method, by reaction in an aqueous medium of allyl chloride and hypochlorous acid. Yields of dichlorohydrin by this reaction are substantially short of theoretical. By virtue of this invention, significantly increased yields of dichlorohydrins may be realized.

According to this invention, yields of dichlorohydrins from the reaction of allyl chloride and hypochlorous acid are enhanced by performing the hypochlorination pursuant to a method which includes separating (usually as a product stream) a portion of the main reaction body from a location in the main body through which an inert gas is passing upwardly and employing the balance of the main body (appropriately replenished, if necessary) as medium for conducting further hypochlorination. As a consequence of separating the product (or a portion of the reaction medium) in this manner and effecting further hypochlorination in a reaction medium formed from the remaining portion of the main body, there is a significant improvement in the yield of the dichlorohydrins.

Hypochlorination of allyl chloride is performed best when the reactants are in low concentration. Thus, it is advantageous to conduct the reaction in a highly dilute reaction medium. This makes it advantageous to add the reactants in small increments to a reaction medium. A continuous process in which the principal component of the reaction medium is used repeatedly is therefore an effective procedure. The performance of this invention is ideally suited to continuous operation.

In a typical embodiment hereof, a circulating stream of reaction medium passing through a defined cyclic path is established. At various locations along the cyclic path of flow, reactants are added while at a still different location, a portion of the stream is withdrawn for the purpose of removing product. Downstream from the point at which the side stream is withdrawn, an inert gas such as carbon dioxide is introduced and bubbles thereof passed countercurrently through the reaction medium, thus providing for movement of the gas through that portion of the stream from which the side stream is withdrawn. Thereafter, the gas is vented from the system.

It is preferred to pass the gas countercurrently and upwardly through the appropriate portion of the stream's path. Therefore, it is found advantageous to provide in the stream's cyclic path a downward run, usually a vertical run. Inert gas is introduced below, usually at a lower point in this downward run, passing vertically upward. At an upper end of the run, or above the point in the run where the side stream is removed, the gas is vented from the system.

Apparently, the presence of the upwardly flowing gas is responsible for increasing above normal (or when no such gas is used) the trichloropropane content in the side stream. In any event, the anticipated buildup of trichloropropane in the circulating medium is retarded, even avoided. This has decided advantages. Increased yields, for example, are realized.

Trichloropropane is a principal side product encountered in the hypochlorination of allyl chloride to dichlorohydrin. Its coproduction is usually regarded as inevitable. In those processes which rely upon repeated use of the reaction medium, e.g., cyclic operations, the coproduction of trichloropropane approaches serious proportions. Apparently, its presence has an undesirable cumulative effect of increasing the formation of further trichloropropane. By virtue of this invention, the increasing degree of trichloropropane formation which normally would occur in a cyclic process is avoided.

By reference to the drawing which represents a diagrammatic illustration of the continuous hypochlorination of allyl chloride and formation of dichlorohydrin, practice of the invention may be easily understood. As illustrated, the apparatus includes a circulatory liquid carrying system comprising tubes 1, 2, 3 and 4 plus pumps for feeding and circulating liquids counterclockwise. The reaction medium is withdrawn through tube 2 and recirculated to the upper portion of the reactor through tubes 3 and 4. Pump 5 serves to maintain the counterclockwise flow of reaction medium downwardly through tube 1, sequentially through tubes 2, 3 and 4 and back to the upper portion of tube 1. Allyl chloride is added to the circulating system through tube 6 as indicated while chlorine is fed through tube feed means 7 into a point within tube 1. An aqueous slurry of calcium carbonate is passed into tube 1 through tube 8 as the source of $CO_2$ and makeup water. Alternatively, when an inert gas such as $CO_2$ is fed directly rather than generated in situ from the $CaCO_3$, water makeup is added via tube 8 and the inert gas added as such using a further means or by mixture with the chlorine feed. Product is removed through tube 9 from an upper portion of tube 1 above the point at which inert gases are introduced. Gases are removed from the system through an appropriate gas outlet means 10.

As can be seen from the diagrammatic illustration of the invention shown in the drawing, the source of inert gas is fed and generated in situ (at above the point of $CaCO_3$ introduction) in tube 1 (representing a vertical run in the circulatory system) and flows upwardly and countercurrent to the downwardly moving stream. At a point substantially above the entry of inert gas or its generation in situ but below the point where gas is removed, the product is removed by withdrawing a side stream.

Use of an aqueous slurry of calcium carbonate is one efficient technique for providing inert gas and makeup water. In this manner, the carbon dioxide is generated in situ in tube 1, while by properly balancing the concentration of calcium carbonate in the slurry, the additional water necessary to maintain the volume of the circulating system constant.

As illustrated, the source of the hypochlorous acid is chlorine. In the aqueous medium, chlorine and water are in equilibrium with hypochlorous acid and hydrogen chloride. Hence, the addition of chlorine to the reaction system provides the hypochlorous acid or for the hypochlorination reagent. Other sources of hydrochlorous acid such as metal hypochlorides such as sodium hypochloride or the like, hypochlorous acid itself, etc., are suitable.

The particular sequence in the cyclic flow path in which the reactants are added is important for optimum operation. Thus, it has been found that the source of hypochlorous acid, chlorine or the like, should be added downstream from the point where the product stream is withdrawn. Downstream from the addition of the source of hypochlorous acid, the allyl chloride is added.

Various reaction conditions are preferably observed. Thus, the reaction is performed in a liquid phase, usually at temperatures between 0° C. and 50° C. Additionally, the reaction medium ideally is highly dilute with respect to the organic components, e.g., products and allyl chloride. Allyl chloride is fed to the system in a proportion of about 1 volume to between 20 and 40 volumes of water. Product dichlorohydrin is accordingly present in a concentration of about 3 percent to about 7 percent by weight of the reaction medium. Although these conditions are recommended for highest yields, operation at conditions which are less than optimum may be used, the principles of this invention effecting an improvement in yield at both optimum and less than optimum conditions.

Any of many inert gases function. Besides carbon dioxide, other inert gases such as nitrogen, argon, oxygen and the like are suitable. They may be fed as a separate stream to the reaction system or they may be fed mixed with the chlorine. Dilute gaseous mixtures of chlorine and other gases commercially encountered often may be used directly as the source of chlorine and inert gas. If convenient or advantageous, the gas may be generated in situ within the reaction medium by use of, for example, carbonate and bicarbonate salts such as calcium carbonate, sodium carbonate, calcium bicarbonate, sodium bicarbonate and the like which under the prevailing conditions generate carbon dioxide. Thus, they may be fed to the reactor in lieu of carbon dioxide.

In the main, the gases are essentially inert (do not react with the reactants or products under the prevailing conditions) and are sufficiently water insoluble that they do not completely dissolve and hence pass upwardly as bubbles through and countercurrent to the downwardly flowing stream of the reaction medium.

The following examples illustrate the manner in which the present invention may be performed:

EXAMPLE I

A circulatory apparatus, as depicted in the drawing, was employed. Section 1 of the apparatus was provided by a glass tube 60 inches long and 2.8 inches in inner diameter. Sections 2 and 4 were provided by glass tubing 10 inches in length and 0.71 inch in inner diameter. Section 4 was a 54 inch long glass tube 0.71 inch in inner diameter. The total volume of this reactor was about 5,500 cubic centimeters.

The system was filled with water and equilibrium conditions established whereafter for a period of 300 minutes allyl chloride was charged at a rate of 1.81 cubic centimeters per minute (a total of 6.62 moles), chlorine was charged at the rate of 1.61 grams per minute (a total of 6.62 moles), and a calcium carbonate solution containing 2.3 percent by weight $CaCO_3$ was fed at the rate of 49.3 cubic centimeters per minute (a total of 14,800 cubic centimeters). The entry of chlorine into the system was through tube 7, a 0.265 inch inner diameter glass tube having affixed to its lowermost end a Pyrex fritted glass sparger of "medium" porosity and terminating 38 inches below the gas removal means. The calcium carbonate slurry was fed into the system approximately midway between the point of chlorine entry and the point of product removal.

With the reaction medium maintained at 38° C., a product stream being continuously removed, gas continuously vented via the overhead of vertical run 1, and the liquid contents of the system circulating at a rate of 5.4 liters per minute through the tubes 2, 3 and 4, a total of 15,710 grams of liquid was removed from the system during the run. This contained 4.95 percent by weight dichlorohydrins, or a total of 778.0 grams (6.03 moles) of dichlorohydrins representing a 91.2 percent yield based on allyl chloride charged, representing substantial improvement over the yield attainable without the proper use of carbon dioxide in the manner of this invention.

EXAMPLE II

Using the apparatus described in Example I, allyl chloride was hypochlorinated by the procedure of Example I at a temperature of between 30° C. and 40° C., usually about 37° C. In lieu of the calcium carbonate slurry, water was fed in an amount sufficient to maintain the volume of the reaction medium constant, and carbon dioxide or air (as indicated and at a rate shown in Table I below) was fed in admixture with the chlorine. The liquid in the system was circulated at the rate of 1,780 cubic centimeters per minute.

The results were as follows:

*Table I*

| Run | Gas | Rate of Gas Introduction [1] | Yield, Percent Dichlorohydrin [2] |
|---|---|---|---|
| A | $CO_2$ | 300 | 92.5 |
| B | Air | 100 | 91.9 |

[1] In cubic centimeters per minute calculated at standard pressure and temperature.
[2] Both isomers.

The foregoing examples demonstrate the high yields of dichlorohydrin which may be realized by practice of the present invention. In the most effective operation of this process, the rate of circulation of the reaction medium is coordinated with other conditions to establish certain conditions. Firstly, the circulation rate is such that the side stream or product withdrawn from the system is essentially free of allyl chloride, e.g., all the allyl chloride has been converted to chlorohydrins or by-product. This means the rate of circulation provides sufficient time in the traverse of the reaction medium from the point of allyl chloride addition to the point of product withdrawal for the allyl chloride and hypochlorous acid to react. Moreover, the rate at which the inert gas is fed to the reactor and passed upwardly through the downwardly moving stream should be coordinated to provide for the upward flow of bubbles of the inert gas.

It will further be understood that reference to yield of dichlorohydrin as herein used is basis all the dichlorohydrin produced, e.g., includes both isomers. Both isomers are equally useful in the preparation of glycerine.

While the present invention has been described with reference to specific details of certain embodiments, it is not intended the invention be construed as limited to such details except insofar as they appear in the appended claims.

I claim:

1. In the process of continuously circulating liquid reaction medium to which allyl chloride and a hypochlorination agent are added and in which allyl chloride is hypochlorinated to produce dichlorohydrin, the improvement which comprises passing an inert gas upwardly and countercurrent to the liquid reaction medium and withdrawing a portion of the reaction medium as a product containing side stream from a location in the reaction medium through which such gas is passing upwardly.

2. In the process of hypochlorinating allyl chloride in an aqueous reaction medium wherein a circulating aqueous liquid reaction medium to which allyl chloride and a source of hypochlorous acid are added is established, the improvement which comprises separating from the circulating body dichlorohydrin by withdrawing a portion of the circulating liquid reaction medium from a location in the downward run in the cyclic path of the circulating medium through which location bubbles of an inert gas are passing upwardly and countercurrently.

3. In the process of hypochlorinating allyl chloride in a dilute aqueous reaction medium wherein a circulating aqueous liquid reaction medium to which allyl chloride and a hypochlorination agent are added is established, the improvement which comprises separating dichlorohydrin by withdrawing a liquid portion of the circulating medium from a location in a downward run in the cyclic path traversed by the circulating medium through which location bubbles of an inert gas are passing upwardly and countercurrently thereby changing the concentration of trichloropropane in the withdrawn medium and suppressing the tendency of trichloropropane to circulate in the circulating aqueous reaction medium.

4. The method of claim 2 wherein chlorine is added to the circulating medium as the source of hypochlorinating agent.

References Cited in the file of this patent

UNITED STATES PATENTS

| 2,130,226 | Britton et al. | Sept. 13, 1938 |
| 2,311,023 | Brooks | Feb. 16, 1943 |
| 2,566,355 | Neuhaus | Sept. 4, 1951 |
| 2,714,121 | Anderson et al. | July 26, 1955 |